United States Patent
Grohs

(10) Patent No.: US 6,844,529 B2
(45) Date of Patent: Jan. 18, 2005

(54) ELECTRIC GRILL WITH FOOD DIVIDER

(76) Inventor: Robert L. Grohs, 18417 Tranquil La., Olney, MD (US) 20832

( * ) Notice: Subject to any disclaimer, the term of this patent is extended or adjusted under 35 U.S.C. 154(b) by 80 days.

(21) Appl. No.: 10/265,619

(22) Filed: Oct. 8, 2002

(65) Prior Publication Data

US 2003/0197001 A1 Oct. 23, 2003

Related U.S. Application Data

(60) Provisional application No. 60/373,305, filed on Apr. 18, 2002.

(51) Int. Cl.[7] .............................. H05B 3/68; A47J 37/10
(52) U.S. Cl. ....................................... 219/450.1; 99/422
(58) Field of Search .......................... 219/450.1, 451.1, 219/455.11, 468.1, 468.2; 99/422, 425, 444, 445

(56) References Cited

U.S. PATENT DOCUMENTS

| | | | | |
|---|---|---|---|---|
| 2,081,078 A | * | 5/1937 | Watson | ........................ 126/373 |
| 5,355,779 A | * | 10/1994 | O'Brien et al. | ................ 99/446 |
| 6,024,014 A | * | 2/2000 | Kasai | .......................... 99/425 |
| 6,064,042 A | * | 5/2000 | Glucksman et al. | ... 219/452.13 |

* cited by examiner

Primary Examiner—S. Paik
(74) Attorney, Agent, or Firm—Liniak, Berenato, White; Joseph Berenato; Robert Jones

(57) ABSTRACT

An electric grill comprised of a primary cooking unit that includes a ribbed grilling surface adjacent to a planar cooking surface with a containment wall around the unit and an adjustable food divider that is used to keep unwanted liquids such as fat and water separate from other foods. One side of the ribbed grilling surface is elevated above the planar cooking surface and includes channels between the ribs that direct grilling liquids into a flat reservoir area. The ribs slope downwardly into the flat reservoir area. The detachable and slideable food divider is used to isolate selected areas of the primary cooking unit and thereby restrict the mixing of foods and grilling liquids.

23 Claims, 8 Drawing Sheets

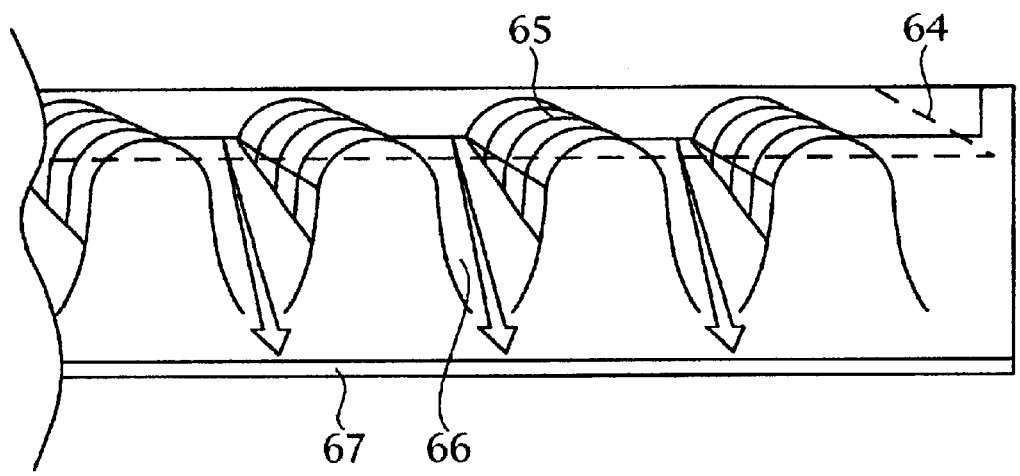
Fig 15 (alt 12)
Fig 16 (alt 7)

ELECTRIC GRILL WITH FOOD DIVIDER

CROSS-REFERENCE TO RELATED APPLICATION

The present application is based on U.S. provisional application (Ser. No. 60/373,305, Filed on Apr. 18, 2002 by Robert Grohs for his "ELECTRIC GRILL AND GRIDDLE WITH REMOVABLE FOOD DIVIDER)."

BACKGROUND OF THE INVENTION

1. Field of the Invention

The present invention relates to cookware and in particular an electric grill comprising a ribbed grilling surface adjoined with a flat cooking surface, with an adjustable food divider that is used to separate food from liquids when positioned on the flat cooking surface.

2. Description of the Background

There is a market for portable cooking devices, and a number of indoor grills were manufactured to meet this demand. Indoor cooking grills are characterized by a heated cooking surface, which uses either electric or gas to cook. One design prevalent in the background art incorporates a clamshell type hinged lid comprising an upper and lower surface. In the closed position, both surfaces cook the food. U.S. Pat. No. 5,845,562 to Deni et al. teaches one such device. The grill comprises a top and bottom cooking surface having a centrally hinge component for lifting or closing the lid. The cooking surfaces comprise rounded ribs and channels, which drain grease and other liquids from the food. Other indoor grills incorporate features such as heating chambers for buns and rolls. U.S. Pat. No. 6,016,641 to Tasi et al. shows an indoor grill having a top and bottom cooking surface in one chamber for cooking foods. Both cooking chambers are accessible by opening a clamshell-like hinged lid.

U.S. Pat. No. 5,606,905 to Boehm, et al. discloses a hinged grilling apparatus comprising upper and lower cooking surfaces. A vapor chamber is formed when the lid is sealed closed over the food. The bottom-cooking surface is inclined to remove grease or other liquids.

Unfortunately each of the above grills is hampered by the miniature size of the cooking surfaces. To maintain portability and conserve counter space while in use and facilitate the opening and closing of the hinged lid, it has been necessary to sacrifice the dimensions of the cooking surface on these grills. The result has been that indoor grills are unsuitable for preparing foods for more people or more types of food using one unit. When preparing foods on an indoor grill, the cook is forced to make smaller amounts of food at a time which increase the overall cooking time, and may require the host to serve food in waves, rather than serving everyone at once. Most of the time, when preparing food the cook may be grilling meat by it self on one surface and not two or three types of different foods on the ribbed grill adjoined by a flat cooking surface.

A further difficulty with indoor grills is found in the limited types of food that can be grilled or cook on the same unit. Flat griddle-like surfaces are useful for frying foods, such as eggs, potatoes or pancakes. By contrast, a ribbed surface is better for grilling foods like meats. The ribbed surface more closely approximates an outdoor grilling arrangement, and channels between the ribs carry away grease and excess water which drain from meats while cooking. Lacking in the art is an indoor grill for cooking, which comprises both types of flat cooking and ribbed grilling surfaces in one electric grill.

It would therefore be advantageous to have an indoor cooking grill that incorporates both ribbed grilling and flat pan or griddle surfaces in a configuration that is large enough to prepare large and small quantities of different types foods at the same time, on one unit, and is economical to manufacture and easily cleaned.

It would be further advantageous to have a way to separate food on these surfaces by using a food divider component that is movable and fits flush with the flat cooking surface and outside walls of the unit. It would be an advantage to keep liquids from mixing with other foods like tomatoes, potatoes or corn with the fat or grease from hamburgers and other meats.

It would further be advantageous to have a grill with both a ribbed and a flat cooking surface one-unit, so that unwanted liquids from different foods are unable to mix, thereby preserving the individual flavor of each food. Finally it would be advantageous to incorporate a temperature control whereby the temperature of the cooking surfaces may be selected from a range of settings.

SUMMARY OF THE INVENTION

It is therefore a primary object of the present invention to provide a portable electric grill which enables the user to simultaneously grill and cook many different types of food on one cooking unit, that consists of a ribbed grill adjoined by a flat cooking surface.

It is another objective of the present invention to provide a ribbed grilling surface adjoined with a flat cooking surface or pan-like surface and is one continuous surface.

It is still another objective of the present invention to provide one cooking surface enclosed by four shallow walls, adjoined with two handles one on each end, to lift the electric grill unit up and off the base platform for easy cleaning and to pour off liquids.

It is another objective of the present invention to provide one continuous surface that is both a ribbed grilling surface and a flat cooking surface in a parallelogram unit.

It is another objective of the present invention to provide a food divider, a separate element, that is positioned on the flat cooking surface to yield two or more grilling and cooking compartments.

It is still anther objective of the present invention to place the food divider in many positions on the flat surface for cooking or detach it for easy cleaning of the electric grill.

It is still another objective of the present invention to channel liquids, release during cooking, by using a plurality of sloping channels molded into the ribbed surface, directly downwardly into a reservoir area at the lower end of the ribbed surface.

It is yet another objective of the present invention to provide an electric grill, one-unit for grilling and cooking.

It is still a further objective of the present invention to supply an integral electric heat source to both the ribbed and flat surfaces.

It is a further objective of the present invention to regulate the cooking surfaces by means of an attachable thermostat which is also an on-off device.

It is still a further objective of the present invention to provide a stable base or platform from which the electric grill can easily be removed and not encumbered.

It is still a further objective of the present invention to provide a stable base of heat resistant plastic which elevates the electric grill over a counter.

These and other objectives are accomplished by a portable electric grill comprising three elements: a ribbed grilling surface adjoined by a flat cooking surface that is one primary cooking unit and comprises an integral heat source; a food divider that separates food and liquids on the flat surface that is adjustable and detachable or acts as a fixed component; a stable base or platform to hold the electric grill in place. The cooking unit comprises a ribbed and flat surface that is bound by four-shallow walls in a parallelogram unit. The cooking unit rests on top of a platform of heat resistant plastic. The base platform comprises four legs, a horizontally disposed platform frame, and a retaining wall that circumscribes three sides of the frame. The cooking surface houses as electric socket connector which mates with a unit carrying temperature dial. The temperature control unit further comprises a length of electrical cord. The cooking surface uses a food divider to separate food and liquids, that's flush with the outside walls and bottom of the flat surface. Further, the food divider separates the ribbed and flat cooking surfaces into two or three compartments and is also detachable.

Other objectives, features and advantages of the present invention will become more apparent from the following detailed description of the preferred embodiments and certain modifications thereof

BRIEF DESCRIPTION OF THE DRAWINGS

FIG. 15 is an alternate ribbed grilling surface, perspective view.

FIG. 16 is an alternate shallow wall surface, no grooves, top view.

DETAILED DESCRIPTION OF THE PREFERRED EMBODIMENTS

Figure 1:
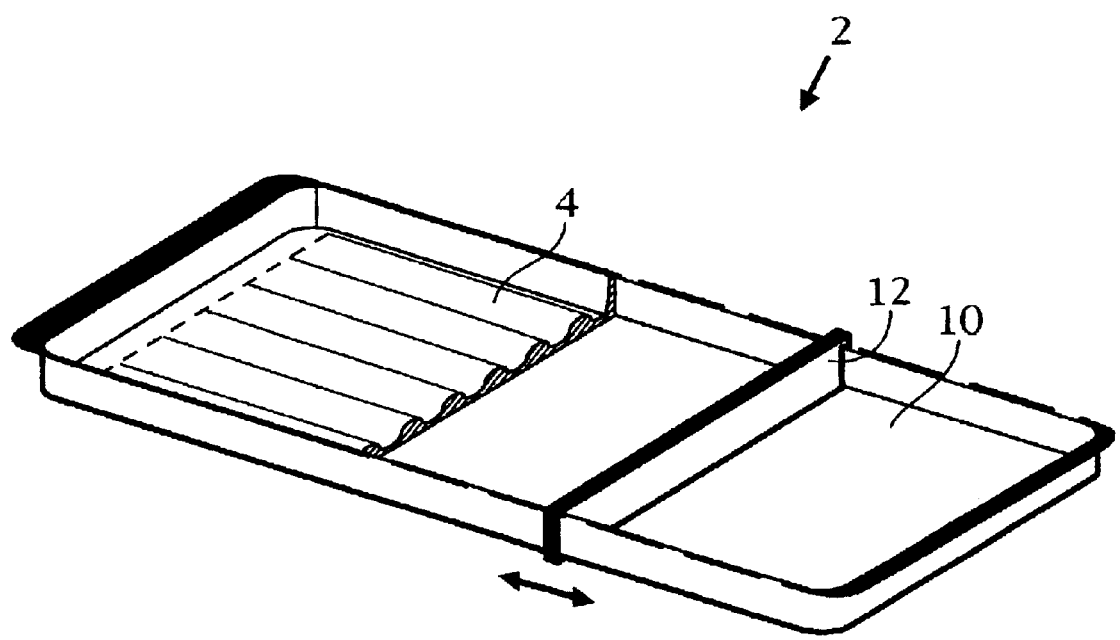
FIG. 1 is a perspective view of the assembled electric grill present invention.

In reference to the drawings and the assembled grill 2 of FIG. 1 includes a primary cooking unit defined as a ribbed grilling surface 4 adjoined by a flat cooking surface 10 and is one unit, with an adjustable and detachable food divider 12.

Figure 2:
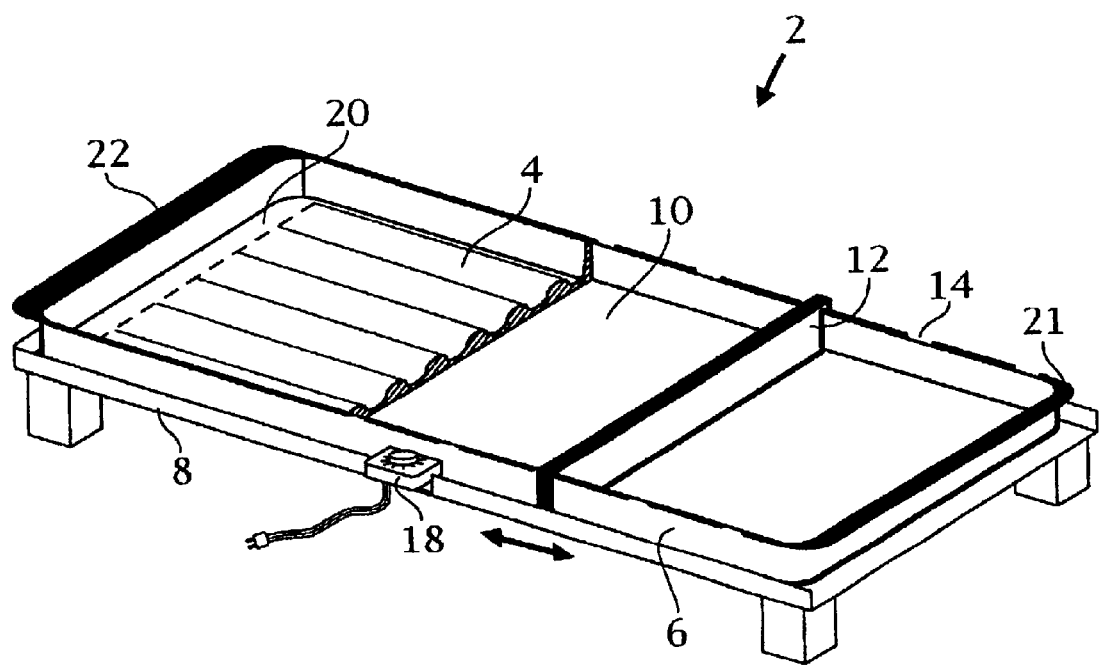
FIG. 2 is a perspective view of the grill in a fully assembled configuration.

With reference to FIG. 2 the cooking surfaces 4 and 10 are enclosed within a shallow wall 6 with a movable food divider 12 and elevated by a base platform 8. A temperature-regulating device 18 attaches to one side of the unit.

Again, with reference to FIG. 2 the shallow wall 6 adjoined with two top handles 21, 22 and four or more shallow wall grooves 14 used to position the food divider 12. The lower end of the ribbed surface 4 adjoins/adjunct to an open flat reservoir area 20 to accumulate liquids and fats that occur while grilling and cooking.

Figure 3:
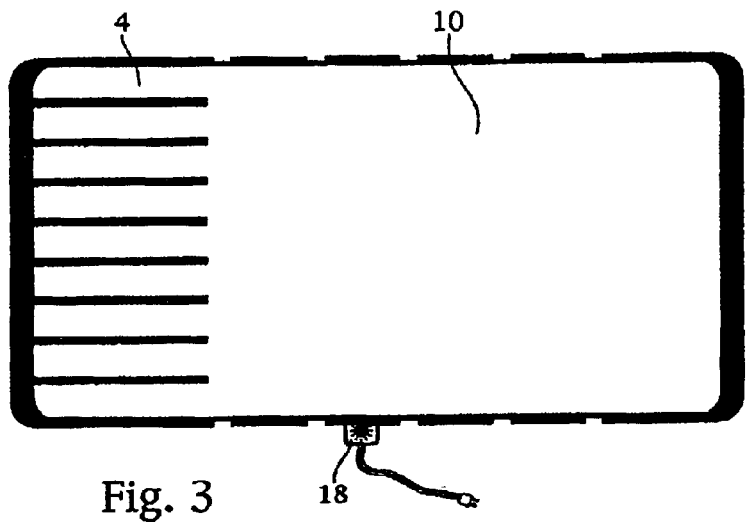
FIG. 3 is a top view of the electric grill with the food divider removed, not in use.

Referring to FIG. 3 is a top view of the electric grill with the ribbed surface 4 adjoined by a flat cooking surface 10, is one continuous surface, with the food divider removed; not in use.

Figure 4:
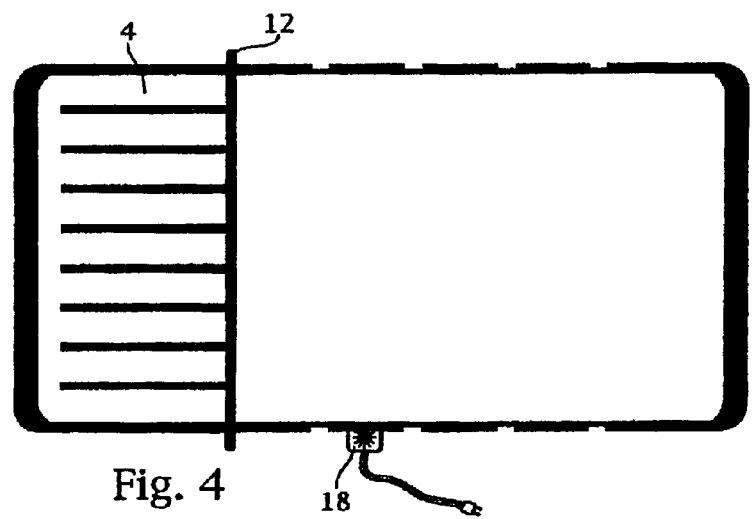
FIG. 4 is a top view of the grill with the food divider or crossbar positioned on the grill.

Referring to FIG. 4 is a top view of the grill with the food divider 12 positioned next to the ribbed surface 4, with a temperature device 18; also shown in FIG. 2.

Figure 5:
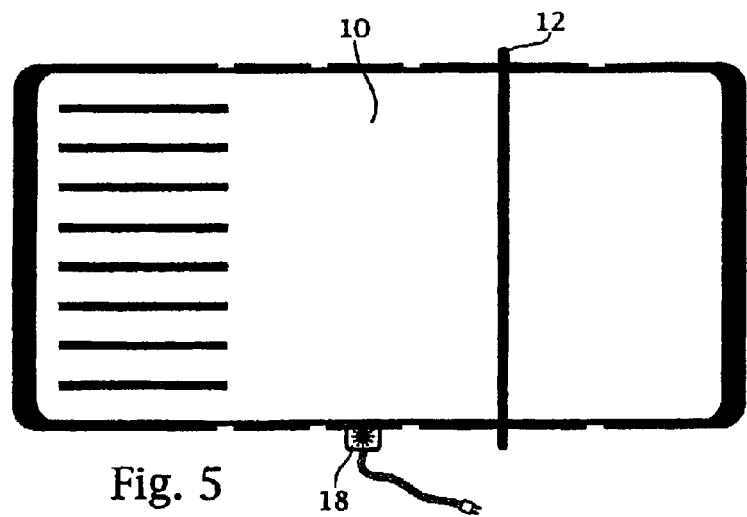
FIG. 5 is a top view of the food divider moved out on the flat cooking surface.

Referring to FIG. 5 is a top view of the grill with the food divider 12 in one of many different position on the flat surface 10.

Figure 6:
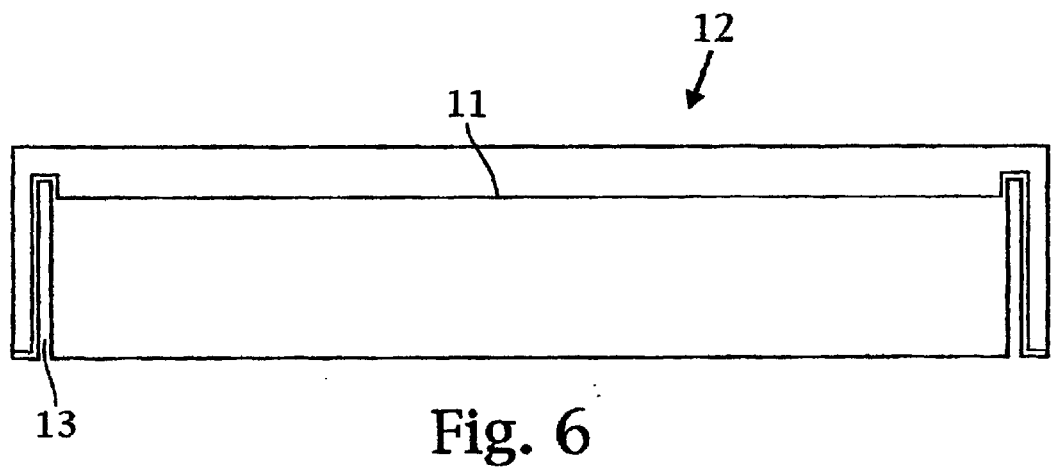
FIG. 6 is a front view of the food divider that fits down over the grill's shallow walls.

Referring to FIG. 6 is the front view of the food divider 12 having two openings 13 one on each end; so the food divider can fit down snugly on the shallow walls and has a heat resistant plastic edge 11 along the top section and two outside ends. The food divider 12 with openings 13 on each end, allows the food divider to move or be placed in positioned. The food divider 12 or crossbar-like element allows for food and liquids to be separated. The plastic heat resistant edge 11 is to avoid any heat surface problems when cooking.

Figure 7:
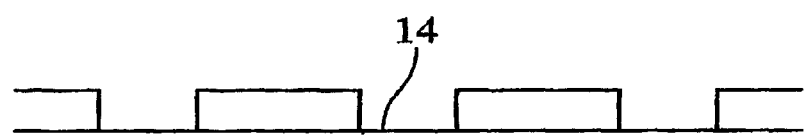
FIG. 7 is a top view of the shallow walls with grooves to position the food divider.

Referring to FIG. 7 is a top view of the shallow wall grooves 14 so the food divider can be positioned down on the walls and flush with the cooking surface; also in FIG. 2.

Figure 8:
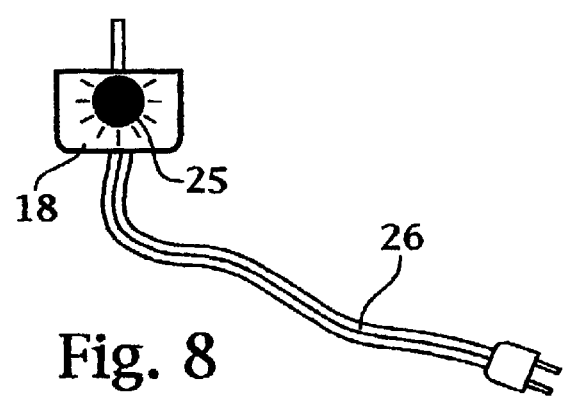
FIG. 8 is the temperature device, on-off control, used to regulate heat.

Referring to FIG. 8 is the temperature device 18, and on-off control 25, used to regulate heat with an electrical plug 26.

Figure 9:
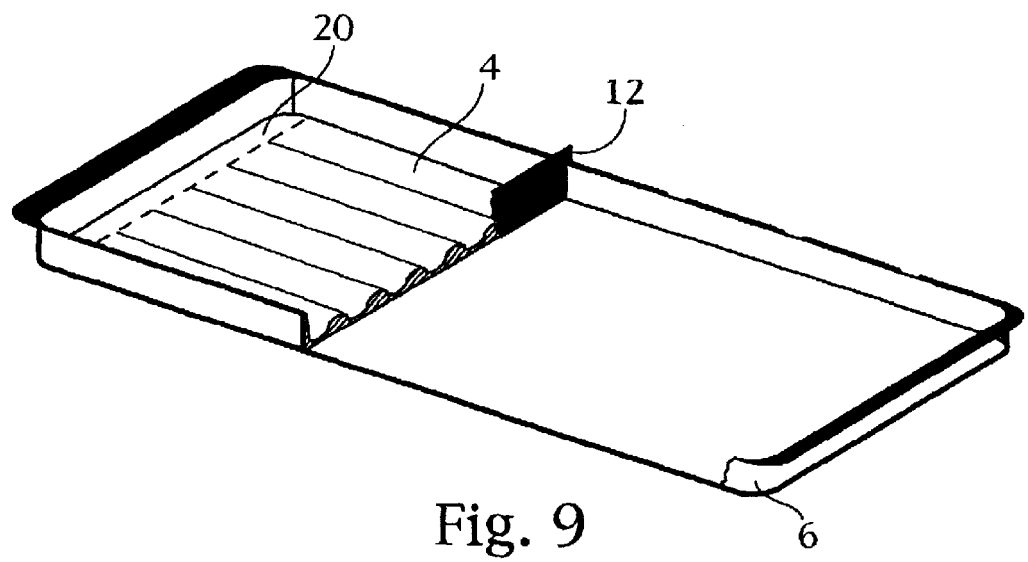
FIG. 9 is a breakaway view of the grill in the shape of a parallelogram unit.

Referring to FIG. 9 is a breakaway perspective of the grill with food divider 12 and retaining wall 6 with ribbed surface 4 and reservoir 20.

Figure 10:
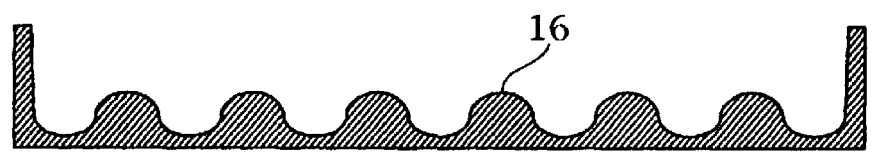
FIG. 10 is the end view of the ribbed surface.

Referring to FIG. 10 is a front view of the ribbed surface 16; also as 4 in FIG. 9.

Figure 11:
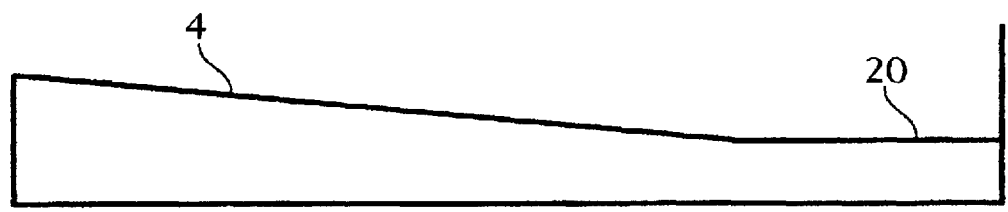
FIG. 11 is a side view of the ribbed channels sloping downwardly into the reservoir.

Referring to FIG. 11 is a side view of the ribbed surface 4 where the channels slope downwardly to an open reservoir 20. The sloping design of ribbed channels 4 allow for liquids to accumulate at the lower flat end in the reservoir area 20. This accumulation area or reservoir 20 allows for the easy pour off of water and fluids from the electric grill. Also again referring to FIG. 2 the platform 8 is not attached to the grill, which promotes easy lift-off once the thermostat 18 is disconnected.

Figure 12:
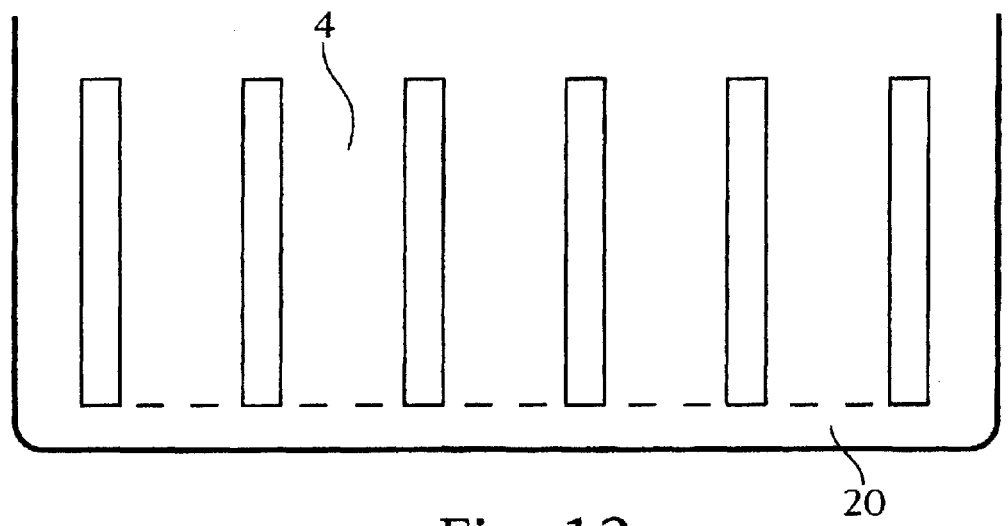
FIG. 12 is a top view of the ribbed surface with reservoir end.

Referring to FIG. 12 is a top view of the ribbed grilling surface 4 that channels the liquid runoff down to the reservoir area 20.

Again referring to FIG. 2. The food divider 12 is a thin rectangular crossbar-like component that is positioned on the flat surface 10. The food divider 12 fits down over the shallow walls 6 across the flat surface 10 and is flush with both surfaces.

Referring again to FIG. 2 the primary unit is enclosed on four sides by shallow walls 6. The unit is preferably of a cast aluminum material and comprises the shape of a parallelogram. The grill incorporates two handles 21, 22 which extends from the top margin of opposite sides that comprise the width dimension of the unit. A conventional socket for plugging in the temperature regulating device 18 with an on-off control is housed along one side of the unit.

Referring to FIG. 1 the cooking surfaces 4 and 10 (adjoined and is one cooking surface) is adapted for grilling and cooking. The ribbed element of the cooking surface 4 comprises a plurality of evenly spaced parallel ribs that slope downwardly and are raised on one side above the flat surface 10. Channels lie between ribs to drain away liquids into a reservoir area 20.

In reference to the assembled grill 2 in FIG. 2 as constructed and as described above conveniently provides both grilling and cooking surfaces on the same apparatus. When the food divider 12 is in place, this provides two or more separate cooking compartments. The flat surface 10 performs a similar function as a griddle but improved with shallow walls 6 to push food up against and to turn food over. A griddle has no shallow wall to push food against for turning purposes and grease may spill over the lip edge. The electric grill solves both of these cooking problems.

Figure 13:
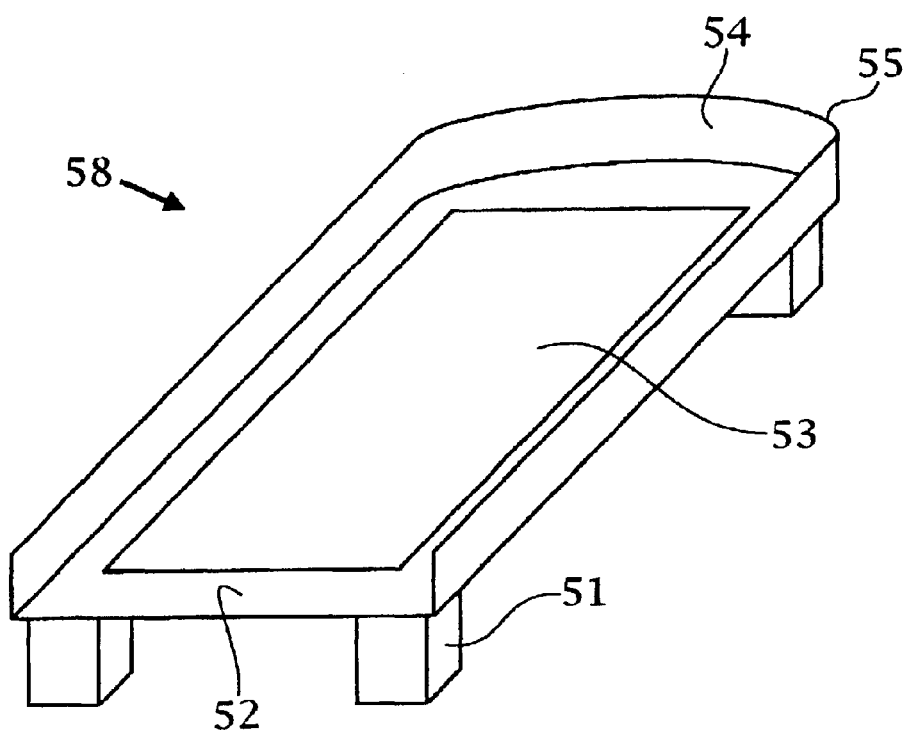
FIG. 13 is a perspective view of the base structure or platform.

Referring to FIG. 13 the base platform 58 defines the platform structure for the grill. Legs 51 extend from each corner of the platform. A horizontally disposed platform 52 defines the bottom surface of the base. The center 53 of the horizontal platform is open to allow heat to escape from the grill. A retaining wall 54 circumscribes three sides of the platform and comprises curved corners 55 on the closed end. The opposite side remains open for easy access enabling the primary cooking unit to slide into or fits down on the platform 52 and inside the shallow retaining wall 54 or to be lifted off the platform without being attached or encumbered. Also in FIGS. 2–8.

Figure 14:
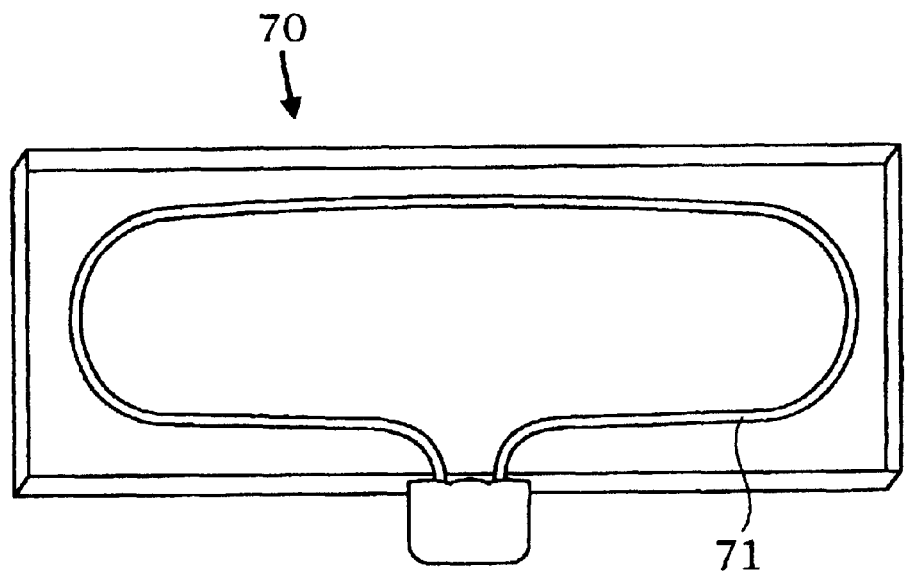
FIG. 14 is the electric loop used to provide heat to the primary cooking unit.

Referring to FIG. 14 is an integral-heating element 71 or electric loop that is used to supply heat to the primary cooking unit 70.

Alternate Detailed Description of the Preferred Embodiments

Referring to alternate FIG. 15, ribbed grilling surface 64 may have a level or horizontal top grilling surface, comprising ribs 65 lying parallel to each other, said ribs are separated by channels 66 that slope downwardly into an open reservoir 67.

With reference to alternate FIG. 16, the top view of shallow wall 6 may be designed with one smooth wall surface; without grooves. With reference to FIG. 2 this design enables the food divider 12 to be placed down on the shallow wall 6, in any positioned required; not only in grooves 14. With reference to FIG. 6., food divider 12 with open grooves 13, must have tight tolerances to restrict unwanted liquids.

Having now fully set forth the preferred embodiments and certain modifications of the concept underlying the present invention, various other embodiments as well as variations and modifications of the embodiments herein shown and described will obviously occur to those skilled in the art upon becoming familiar with said underlying concept. It is to be understood, therefore, that the invention may be practiced otherwise than specifically set forth in the appending claims.

I claim:

1. An electric grill comprising:
    a primary cooking unit including:
        a ribbed grilling surface having individual ribs extending in a first direction;
        a planar cooking surface adjacent to said ribbed grilling surface; and,
        a detachable food divider extending perpendicular to said individual ribs;
    wherein said food divider is movably positioned between said ribbed grilling surface and said planar cooking surface so that said ribbed grilling surface is selectively isolated from said planar cooking surface.

2. The electric grill of claim 1 wherein said food divider is detachable so that when said food divider is removed, said ribbed grilling surface and said planar cooking surface form one continuous cooking surface.

3. The electric grill of claim 1 wherein said primary cooking unit has a first distal end and a second distal end, said ribbed grilling surface being disposed at said first distal end and said planar cooking surface being disposed at said second distal end.

4. The electric grill of claim 3 wherein said ribbed grilling surface has an elevated end abutting said planar cooking surface and a non-elevated end adjacent to said first distal end.

5. The electric grill of claim 4 further comprising a grilling fluid reservoir abutting said non-elevated end, said elevated end causing fluids associated with grilling to flow laterally down channels between said individual ribs and collect in said reservoir.

6. The electric grill of claim 5 wherein said ribbed grilling surface and said channels slants downwardly from said ribbed grilling surface elevated end to said reservoir so that said grilling fluids are channeled to said reservoir.

7. The electric grill of claim 5 further comprising a containment wall extending around a perimeter of said primary cooking unit, said containment wall abutting said reservoir at said first distal end.

8. The electric grill of claim 5 wherein said reservoir is flat.

9. The electric grill of claim 5 wherein said individual ribs extend essentially horizontally and said channels between said individual ribs slant downwardly from said ribbed grilling surface elevated end to said reservoir.

10. The electric grill of claim 1 further comprising a heating assembly operably associated with said primary cooking unit, said heating assembly comprising:
    a heating coil for providing beat said primary cooking unit; and,
    a rheostatic temperature regulating device for regulating heat provided by said heating coil.

11. The electric grill of claim 10 wherein said primary cooking unit surface is heated to enable said primary cooking unit to cook a wide variety of foods.

12. The electric grill of claim 11 wherein said food divider extends from a first side of said primary cooking unit to a second side of said primary cooking unit, said food divider abutting a containment wall at said first and second sides.

13. The electric grill of claim 12 wherein said food divider has first distal end and a second distal end, said food divider having a slot at each of said first and second distal ends so that said food divider slot engages said containment wall to form a secure fit.

14. The electric grill of claim 13 wherein said containment wall includes grooves corresponding to said food divider slots to further secure said food divider to said containment wall.

15. The electric grill of claim 13 wherein said containment walls are smooth so that said food divider slides along said containment wall to isolate selected areas of said primary cooking unit.

16. The electric grill of claim 10 wherein said heating coil is molded into said primary cooking unit, said heating coil concurrently heating said planar cooking surface to essentially an equal temperature as said ribbed grilling surface.

17. The electric grill of claim 1 wherein said food divider acts as a fixed wall component if left in one position on said planar cooking surface.

18. The electric grill of claim 1 wherein said primary cooking unit is comprised of metal, said primary cooking unit being configured in a parallelogram shape having rounded corners to facilitate cleaning and the pouring off of liquids from said corners.

19. The electric grill of claim 18 wherein said primary cooking unit is comprised of cast aluminum.

20. The electric grill of claim 1 wherein said food divider is moveable and detachable so that said food divider selectively divides said planar cooking surface into at least two isolated cooking compartments.

21. The electric grill of claim 1 wherein said primary cooking unit is disposed within a base platform said primary cooking unit having at least one handle that enables said primary cooking unit to be lifted off of said base platform.

22. The electric grill of claim 21 wherein said base platform comprises:
   a partially open bottom side to allow dissipation of heat generated by said primary cooking unit;
   two parallel vertical retaining walls extending from said bottom side;
   a curved retaining wall connected to said two parallel retaining walls; and,
   an open end disposed opposite said curved retaining wall to facilitate movement of said primary cooking unit on and off of said base platform.

23. An electric grill comprising:
   a cast aluminum primary cooking unit having rounded corners and configured in a parallelogram shape, said primary cooking unit having a first side and an opposite second side, and a first distal end and an opposite second distal end, said primary cooking unit comprising:
      a containment wall disposed around a perimeter of said primary cooking unit;
      a ribbed grilling surface having individual ribs extending in a first direction, said ribbed grilling surface having an elevated end and a non-elevated end, said non-elevated end being disposed adjacent to said first distal end of said primary cooking unit;
      a reservoir for collecting grilling liquids from said ribbed grilling surface, said reservoir having a first side abutting said non-elevated end and a second side abutting said containment wall at said primary cooking unit first distal end;
      a planar cooking surface having a first end adjacent to said ribbed grilling surface elevated end, and a second end adjacent to said containment wall at said primary cooking unit second distal end;
      a detachable food divider extending perpendicular to said grilling surface individual ribs, said food divider extending from said primary cooking unit first side to said primary cooking unit second side, said food divider selectively isolating said ribbed grilling surface from said planar cooking surface; and,
      a heating assembly comprising a beating coil having a rheostatic temperature regulating device and a heating coil that is molded into said primary cooking unit; and,
   a base for supporting said primary cooking unit, said base comprising a raised platform with an open bottom and two parallel vertically extending retaining walls, said base further comprising a curved retaining wall connected to said two parallel retaining walls, said base having an open end disposed opposite said curved retaining wall to facilitate movement of said primary cooking unit on and off of said base.

* * * * *